US 9,188,233 B2

(12) United States Patent
Roper et al.

(10) Patent No.: US 9,188,233 B2
(45) Date of Patent: Nov. 17, 2015

(54) POSITIONING DEVICE FOR PRESSURE REGULATOR

(71) Applicant: EMERSON PROCESS MANAGEMENT REGULATOR TECHNOLOGIES, INC., McKinney, TX (US)

(72) Inventors: Daniel G. Roper, Lucas, TX (US); Harold J. Mckinney, Durant, OK (US); Thomas L. Weyer, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/453,224

(22) Filed: Aug. 6, 2014

(65) Prior Publication Data

US 2014/0346384 A1 Nov. 27, 2014

Related U.S. Application Data

(62) Division of application No. 11/854,261, filed on Sep. 12, 2007, now Pat. No. 8,826,933.

(60) Provisional application No. 60/827,588, filed on Sep. 29, 2006.

(51) Int. Cl.
*F16K 31/126* (2006.01)
*F16K 15/18* (2006.01)
(Continued)

(52) U.S. Cl.
CPC .................. *F16K 15/185* (2013.01); *F16K 1/52* (2013.01); *F16K 15/186* (2013.01); *F16K 31/126* (2013.01); *G05D 16/0669* (2013.01); *Y10T 137/5994* (2015.04); *Y10T 137/7929* (2015.04)

(58) Field of Classification Search
CPC ...................................................... F16K 31/126
USPC .................................................. 251/282, 337
See application file for complete search history.

(56) References Cited

U.S. PATENT DOCUMENTS

| 1,229,860 A | 6/1917 | Ashelman et al. |
| 2,615,468 A | 10/1952 | Bradford |

(Continued)

FOREIGN PATENT DOCUMENTS

| GB | 1064678 | 4/1967 |
| JP | 64-29580 | 2/1989 |

OTHER PUBLICATIONS

European Office Action for Application No. 07814997.8-2422, dated Mar. 13, 2012.

(Continued)

*Primary Examiner* — Kevin Murphy
(74) *Attorney, Agent, or Firm* — Marshall, Gerstein & Borun LLP

(57) ABSTRACT

A control assembly for converting a "fail-close" regulator to a "fail-open" regulator, or vice versa, without having to modify or reconfigure a casing of the regulator includes a control member, a central rod, and a spring disposed between first and second spring seats. A regulator including the control assembly includes a valve body and an actuator casing, the valve body defining a fluid flow-path. The control member is slidably disposed within the actuator casing and adapted for displacement relative to the valve body for controlling the flow of fluid through the flow-path. The spring and spring seats are disposed about the central rod, such that the spring biases the control member into a predetermined position relative to the regulator casing.

16 Claims, 4 Drawing Sheets

(51) Int. Cl.
*G05D 16/06* (2006.01)
*F16K 1/52* (2006.01)

(56) References Cited

U.S. PATENT DOCUMENTS

| | | | |
|---|---|---|---|
| 2,625,178 A | 1/1953 | Price | |
| 3,175,473 A | 3/1965 | Boteler et al. | |
| 3,478,774 A | 11/1969 | Noakes et al. | |
| 3,529,622 A | 9/1970 | Weise et al. | |
| 3,892,384 A | 7/1975 | Myers | |
| 4,171,925 A | 10/1979 | Krambrock | |
| 4,235,413 A | 11/1980 | Baker | |
| 4,362,475 A | 12/1982 | Seitz | |
| 4,783,046 A | 11/1988 | Young et al. | |
| 5,392,807 A | 2/1995 | Caudle et al. | |
| 5,525,047 A | 6/1996 | Sternenberg et al. | |
| 5,816,286 A | 10/1998 | Scott et al. | |
| 5,833,210 A | 11/1998 | Sommer | |
| 6,595,237 B2 | 7/2003 | Cecchinato et al. | |
| 7,748,401 B2 | 7/2010 | Zecchi et al. | |

OTHER PUBLICATIONS

Extended European Search Report for Application No. 121635502.2., dated Jun. 29, 2012.
International Search Report and Written Opinion for International Application No. PCT/US2007/079540, dated Mar. 13, 2008.
Office Action for Chinese Application No. 200780035474.8, dated May 11, 2010.
Office Action for Gulf Cooperation Council Application No. 2007/9176, dated Jan. 16, 2012.
Office Action for Gulf Cooperation Council Application No. 2007/9176, dated Jan. 21, 2011.
Office Action for Japanese Application No. 2009-530574, dated Feb. 21, 2012.
Office Action for Russian Application No. 2009113543, dated Oct. 11, 2011.
Written Opinion of the International Searching Authority for PCT/US2007/079540 mailed Mar. 13, 2008.
Canadian Office Action for Application No. 2,664,431, dated Dec. 17, 2013.

POSITIONING DEVICE FOR PRESSURE REGULATOR

CROSS-REFERENCE TO RELATED APPLICATIONS

This is a divisional of U.S. patent application Ser. No. 11/854,261, filed Sep. 12, 2007, and which claims the benefit of priority of U.S. Provisional Patent Application Ser. No. 60/827,588, filed Sep. 29, 2006, the entire contents of which are expressly incorporated herein by reference.

FIELD OF THE DISCLOSURE

The present disclosure generally relates to a fluid control device and, more particularly, to a positioning device for a fluid control device.

BACKGROUND

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known regulator assembly 10 including a valve body 12 and an actuator 14. The valve body 12 defines a flow-path 16 and includes a throat 18. In FIG. 1, the regulator assembly 10 is configured in a flow-up configuration. The actuator 14 includes an upper actuator casing 20, a lower actuator casing 22, a diaphragm subassembly 30 including a diaphragm 32, and a control member 24.

The control member 24 is disposed within the upper and lower actuator casings 20, 22 and is adapted for bi-directional displacement in response to changes in pressure across the diaphragm subassembly 30. So configured, the control member 24 controls the flow of fluid through the throat 18. Additionally, as is depicted, the regulator assembly 10 includes a seat ring 26 disposed in the throat 18 of the valve body 12. When the outlet pressure of the valve body 12 is high, a sealing surface 28 of the control member 24 may sealingly engage the seat ring 26 and close the throat 18. Similarly, absent any pressure in the actuator 14 or upon the failure of the diaphragm 32, a coil spring 34 disposed within an annular cavity portion 36 of the upper actuator casing 20 biases the control member 24 into the closed position. Such a regulator is commonly known as a "fail close" regulator.

"Fail close" regulators are configured such that upon the occurrence of a leak in the system, which removes pressure from the actuator 14, or a failure of the diaphragm 32 such as a tear, the control member 24 automatically closes the flow of fluid through the regulator 10. Under such a circumstance, fluid delivery to the desired end-location ceases until the regulator is repaired.

To avoid the necessity of terminating fluid delivery under failure conditions, some fluid process or delivery systems incorporate a "fail open" regulator. "Fail open" regulators operate similar to "fail closed" regulators; however, upon failure of the diaphragm, a spring biases the control member open, rather than closed. Thus, even when the diaphragm or other control component fails, fluid continues to flow through the regulator uninterrupted and uncontrolled. Such configurations therefore often include a monitor regulator, which controls the fluid flow when the "fail open" regulator fails.

Conventional regulators are generally configured as either "fail open" or "fail close." To reconfigure a "fail open" regulator to operate as a "fail close" regulator, or vice versa, the control assembly and the regulator casing often must be reconfigured or replaced with a different control assembly and regulator casing. Such reconfiguration and/or replacement of the regulator casing can be costly and time-consuming.

SUMMARY OF THE DISCLOSURE

One embodiment of the present disclosure provides a positioning device assembly for regulating the flow of a fluid through a fluid flow-path of a regulator. The positioning device assembly comprises a control member, a central rod, a first spring seat, a second spring seat, and a spring. The central rod is adapted to be disposed through a casing of the regulator. The first spring seat defines an opening receiving the central rod and is fixed relative to the central rod. The second spring seat defines an opening receiving the central rod and is fixed relative to one of the regulator casing and the control member. The spring is disposed between the first and second spring seats and biases the control member into a predetermined position relative to the regulator casing.

Another embodiment of the present disclosure comprises a regulator comprising a valve body defining a flow-path, an actuator casing coupled to the valve body, a control member, a central rod, first and second spring seats, and a spring. The control member is disposed within the actuator casing and adapted for displacement relative to the valve body for regulating a flow of the fluid through the flow-path. The central rod is disposed through the actuator casing. The first spring seat is fixed relative to the central rod, and the second spring seat is fixed relative to one of the actuator casing and the control member. The spring is disposed between the first spring seat and the second spring seat and biases the control member into a predetermined position within the casing of the regulator.

Yet another embodiment of the present disclosure provides regulator comprising a valve body, an actuator casing, a control member, and a positioning device assembly. The valve body defines a flow-path for a fluid, and the actuator casing is coupled to the valve body. The control member is disposed within the actuator casing and adapted for displacement relative to the valve body for regulating a flow of the fluid through the flow-path. The positioning device assembly comprises a central rod and a spring disposed about the central rod. At least a portion of the central rod is disposed within the control member, and the spring biases the control member into a predetermined position relative to the valve body.

DETAILED DESCRIPTION OF THE DISCLOSURE

Figure 2:
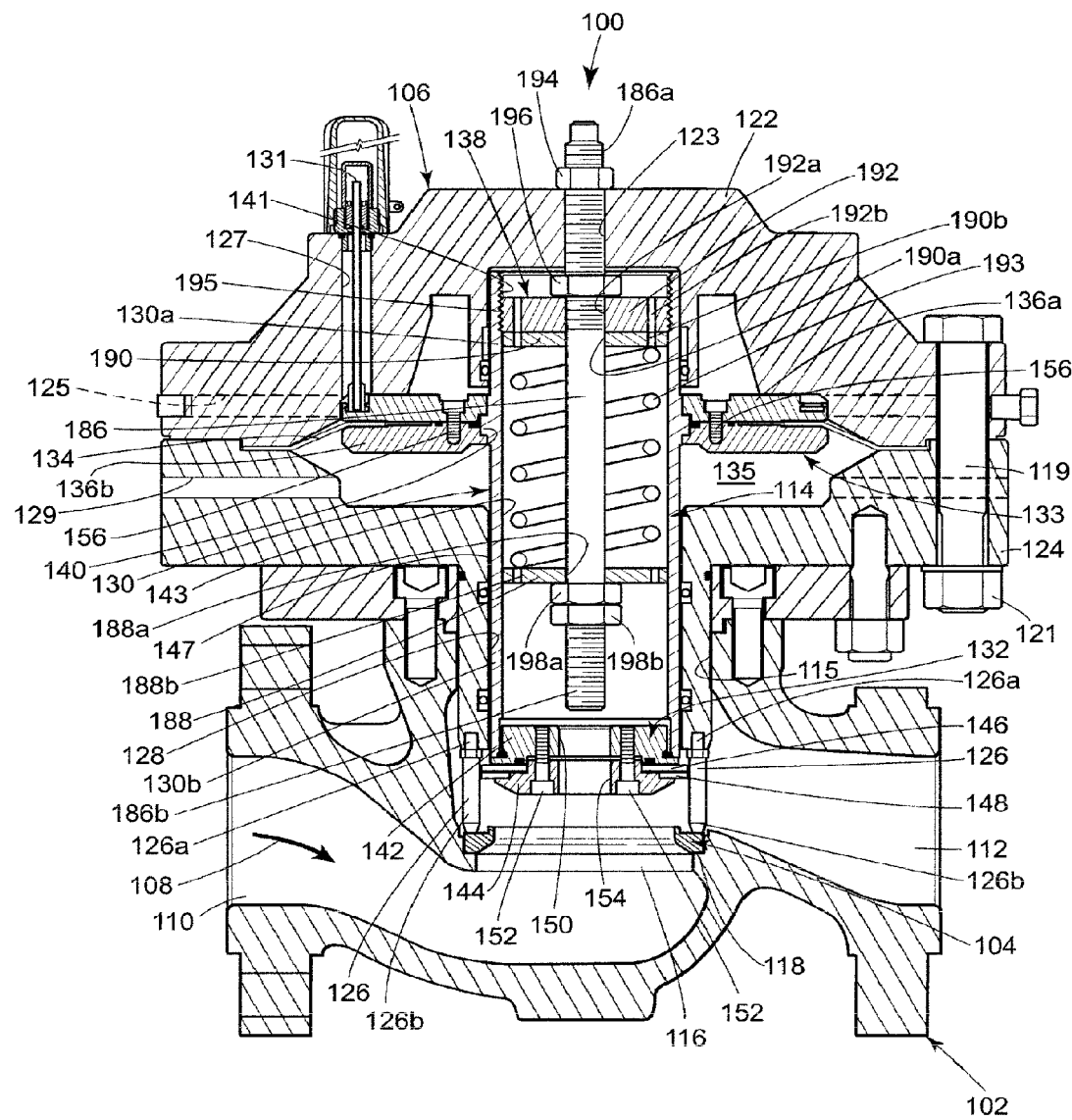
FIG. 2 is a cross-sectional side view of one embodiment of a "fail open" regulator constructed in accordance with the principles of the present disclosure.

Referring to FIG. 2, a first embodiment of a control device constructed in accordance with the principles of the present disclosure includes a pressure regulator 100. The pressure regulator 100 generally includes a valve body 102, a seat ring 104, and an actuator 106. The valve body 102 defines a flow-path 108 extending between an inlet 110 and an outlet 112, as well as into the actuator 106, as will be discussed. The actuator 106 includes a control assembly 114 that is moveable between an open position, as is shown in FIG. 2, and a closed position (not shown), wherein the control assembly 114 engages the seat ring 104. Movement of the control assembly 114 occurs in response to fluctuations in the pressure of the fluid at the inlet 110 and outlet 112. Accordingly, the position of the control assembly 114 relative to the seat ring 104 affects a flow capacity of the pressure regulator 100.

The valve body 102 further defines a throat 116 between the inlet 110 and the outlet 112. The throat 116 includes a stepped portion 118 accommodating and supporting the seat ring 104. In one form, an o-ring may be disposed between the seat ring 104 and the stepped portion 118 of the throat 116 to provide a fluid-tight seal therebetween.

The actuator 106, as stated above, includes the control assembly 114 and additionally, an upper actuator casing 122, a lower actuator casing 124, and a plurality of pins 126. The upper and lower actuator casings 122, 124 are secured together by at least one threaded fastener 119 and corresponding nut 121. The upper actuator casing 122 defines a central opening 123, a first control inlet 125 (depicted in phantom), and a travel chamber 127. The travel chamber 127 contains a travel indicator 131, which indicates the position of the control assembly 114 within the actuator 106. The lower actuator casing 124 defines a second control inlet 129.

In cooperation, the upper and lower actuator casings 122, 124 define a cavity 135 including a hollow neck 128. The hollow neck 128 is disposed within an actuator opening 115 in the valve body 102. As identified in FIG. 2, the plurality of pins 126 have first ends 126a fixed to the hollow neck 128 and second ends 126b located distally to the hollow neck 128. In the form illustrated, the first ends 126a are threaded into bores formed in the hollow neck 128. The second ends 126b engage the seat ring 104. Accordingly, the pins 126 and the stepped portion 118 of the throat 116 sandwich and axially locate and secure the seat ring 104 in the valve body 102. While the regulator 100 has been described as including a plurality of pins 126 locating the seat ring 104 relative to the valve body 102, an alternate form of the regulator 100 may include a cage disposed in the throat 116 to locate the seat ring 104. In another form, the seat ring 104 may be threaded, adhered, or otherwise fixed to the valve body 102.

Still referring to FIG. 2, the control assembly 114 includes a control member such as a hollow sleeve 130, a mounting subassembly 132, a diaphragm subassembly 133, and a positioning device assembly 138. The sleeve 130 is generally tubular defining a generally cylindrical inner surface 143 and a generally cylindrical outer surface 147. The inner surface 143 defines a central bore through the sleeve 130. Additionally, the sleeve 130 includes an upper end 130a and a lower end 130b. The upper end 130a is disposed within the cavity 135 and the lower end 130b is disposed within the hollow neck 128 of the lower actuator casing 124. The upper end 130a of the sleeve 130 is open and includes a circumferential flange 140 formed on the outer surface 147. Additionally, the upper portion 130a of the sleeve 130 includes a threaded portion 141 on the inner surface 143. The lower end 130b of the sleeve 130 is open and accommodates the mounting subassembly 132.

The mounting subassembly 132 includes a mounting member 142, a disk retainer 144, a disk holder 146, and a sealing disk 148. In the disclosed form, the mounting member 142 includes a generally cylindrical body threaded into the open lower end 130b of the sleeve 130 and defining a through-bore 150. The through-bore 150 is generally axially aligned with the sleeve 130. The disk retainer 144 includes a generally cylindrical body fixed to the mounting member 142 with a pair of fasteners 152. In the form illustrated, the fasteners 152 include threaded fasteners. Similar to the mounting member 142, the disk retainer 144 defines a through-bore 154. The through-bore 154 of the disk retainer 144 has a diameter substantially identical to a diameter of the through-bore 150 in the mounting member 142 and is axially aligned therewith.

As depicted, the disk retainer 144 secures the disk holder 146 and the sealing disk 148 to the mounting member 142 of the retainer assembly 132. The disk holder 146 includes a generally ring-shaped plate constructed of a rigid material such as steel. The sealing disk 148 includes a generally ring-shaped disk made of a resilient material and fixed to the disk holder 146. In one form, the sealing disk 148 is fixed to the disk holder 146 with an adhesive. In accordance with the disclosed form, the configuration of the disk retainer 144 limits radial deformation of the sealing disk 148 when the control assembly 114 is in a closed position and compressing the sealing disk 148 against the seat ring 104.

Referring now to the upper portion of the regulator 100 depicted in FIG. 2, the diaphragm subassembly 133 includes a diaphragm 134, an upper diaphragm plate 136a and a lower diaphragm plate 136b. The upper and lower diaphragm plates 136a, 136b are clamped onto the circumferential flange 140 of the sleeve 130. The diaphragm plates 136a, 136b are secured together via fasteners 156, thereby fixing the sleeve 130 and the diaphragm plates 136a, 136b together. Additionally, the diaphragm plates 136a, 136b sandwich a radially inward portion of the diaphragm 134. A radially outward portion of the diaphragm 134 is fixed between the upper and lower actuator casings 122, 124.

The positioning device assembly 138 is primarily disposed within the sleeve 130 to bias the sleeve 130 into the open position depicted in FIG. 2. The positioning device assembly 138 generally comprises a central rod 186, a first spring seat 188, a second spring seat 190, a spring 193, and a retention plate 192. The central rod 186 includes a first threaded end 186a and a second threaded end 186b. The first threaded end 186a extends through the central opening 123 of the upper actuator casing 122. An external nut 194 is threaded onto the first threaded end 186a to limit axial displacement of the central rod 186 in the downward direction relative to the orientation of the actuator 100 depicted in FIG. 2. An intermediate nut 196 is threaded onto the first threaded end 186a of the central rod 186 beyond the external nut 194 to limit axial displacement of the central rod 186 in the upward direction relative to the orientation of the actuator 100 depicted in FIG. 2. Accordingly, the first threaded end 186a of the central rod 186 is effectively fixed against axial displacement relative to the upper actuator casing 122 and the second threaded end 186b extends into the actuator 106.

Accordingly, as depicted, the second threaded end 186b of the central rod 186 extends into the sleeve 130 and is disposed adjacent the second end 130b of the sleeve 130. A pair of retention nuts 198a, 198b are threaded onto the second threaded end 186b of the central rod 186. The retention nuts 198a, 198b support the first spring seat 188, the spring 193, and the second spring seat 192 on the central rod 186. The first spring seat 188 is slidably disposed within the sleeve 130, as will be discussed in more detail below. More specifically, the first spring seat 188 comprises a generally cylindrical plate in engagement with the retention nuts 198a, 198b. The spring 193 therefore fixes the second spring seat 192 against the retention plate 192, and relative to the sleeve 130. Moreover, the first spring seat 188 is fixed relative to the central rod 186 and defines a central opening 188a and a plurality of apertures 188b. The central opening 188a receives the second end 186b of the central rod 186 directly adjacent the retention nuts 198a, 198b. The plurality of apertures 188b are in fluid communication with the through-bores 150, 154 in the mounting subassembly 132, and therefore the flow-path 108.

Similarly, the second spring seat 190 comprises a generally cylindrical plate defining a central opening 190a and a plurality of apertures 190b. The central opening 190a in the second spring seat 190 receives the central rod 186 near the first threaded end 186a. The plurality of apertures 190b are in fluid communication with the plurality of apertures 188b in the first spring seat 188, and therefore the flow-path 108. Accordingly, as depicted, the spring 193 is disposed axially between and in engagement with the first spring seat 188 and the second spring seat 190. The first spring seat 188, which is fixed by the retention nuts 198 against displacement in the downward direction relative to the central rod 186, supports the spring 193. Thus, the spring 193 supports the second spring seat 190.

Moreover, the retention plate 192 comprises a generally cylindrical plate defining a central opening 192, a plurality of apertures 192b, and a threaded portion 195. The threaded portion 195 of the retention plate 192 is fixed by threaded engagement with the threaded portion 141 on the inner surface 143 of the sleeve 130. Accordingly, the retention plate 192 and the sleeve 130 act as a unitary structure.

During assembly, with the upper actuator casing 122 removed from the lower actuator casing 124 and the sleeve 130 removed from between the diaphragm plates 136a, 136b, the retention plate 192 is threaded into the threaded portion 141 of the sleeve 130. Subsequently, the intermediate nut 196 is threaded onto the first threaded end 186a of the central rod 186. The second threaded end 186b of the central rod 186 is then disposed through the central opening 192a of the retention plate 192. Next, with the central rod 186 in place, the second spring seat 190, the spring 193, and the first spring seat 188 are slid onto the central rod 186, in that order, via the opening in the lower portion 130b of the sleeve 130. The retention nuts 198a, 198b are then threaded onto the second threaded end 186b of the central rod 186, as depicted.

At this point, a technician or engineer may preload the positioning device assembly 138 by tightening either the intermediate nut 196 disposed adjacent the retention plate 192 or the retention nuts 198a, 198b disposed adjacent the first spring seat 188. For example, tightening the intermediate nut 196 pulls the central rod 186 through the second spring seat 190 and the retention plate 192. This causes the retention nuts 198a, 198b to apply an axial force to the first spring seat 188 and displace the first spring seat 188 toward the second spring seat 190. Continued tightening of the intermediate nut 196 compresses the spring 193 between the first and second spring seats 188, 190.

Alternatively, tightening the retention nuts 198a, 198b disposed adjacent the first spring seat 188 forces the first spring seat 188 toward the second spring seat 190 to compress the spring 193. It should be appreciated that in the depicted embodiment, the retention nuts 198a, 198b comprise a first retention nut 198a disposed directly adjacent the first spring seat 188 and a second retention nut 198b disposed directly adjacent the first retention nut 198a opposite the first spring seat 188. Accordingly, in the above-described preloading operation, a technician or engineer would first tighten the first retention nut 198a to displace the first spring seat 188 to compress the spring 193. Subsequently, the technician or engineer would tighten the second retention nut 198b into engagement with the first retention nut 198a to effectively lock the first retention nut 198a in place on the central rod 186.

Additionally, it should be appreciated that in one embodiment of the positioning device assembly 138 disclosed herein, the central rod 186 may comprise markings along the lengths of at least one of the threaded portions 186a, 186b, such that the technician or engineer performing either of the above-described pre-loading operations may tighten the intermediate nut 196 or the retention nuts 198a, 198b to a predetermined position on the central rod 186, thereby pre-loading the spring 193 a predetermined amount.

With the positioning device assembly 138 appropriately pre-loaded, the circumferential flange 40 of the sleeve 130 is coupled into the diaphragm plates 136a, 136b and the lower portion 130b of the sleeve 130 is disposed within the neck 128 of the lower actuator casing 124. The upper actuator casing 122 is then positioned onto the lower actuator casing 124 such that the first threaded end 186 of the central rod 186 is disposed through the central opening 123. A technician or engineer can then secure the upper actuator casing 122 to the lower actuator casing 124 with the threaded fasteners 119. Finally, the technician or engineer tightens the external nut 194 onto the first threaded end 186a of the central rod 186. Tightening the external nut 194 pulls the central rod 186, and therefore the intermediate nut 196 and the first spring seat 188 upward relative to the orientation of the regulator 100 depicted in FIG. 2. The external nut 194 and the intermediate nut 196 sandwich the upper actuator casing 122, as depicted. So configured, the external nut 194 and the intermediate nut 196 fix the central rod 186 against axial displacement relative to the upper actuator casing 122. Additionally, the retention nuts 198a, 198b fix the first spring seat 188 against axial displacement in the downward direction relative to the orientation of the regulator 100 depicted in FIG. 2.

In general, when the regulator assembly 100 is installed within a fluid process control or fluid delivery system, the control assembly 114 is able to reciprocally displace within the cavity 135 and hollow neck 128 of the actuator 106 based on the pressure of the fluid at the inlet 110 and outlet 112 of the valve body 102. Specifically, fluid flows from the inlet 110 and through the throat 116. Once the fluid passes through the throat 116, a substantial portion of the fluid flows to the outlet 112, while the remainder flows through the through-bores 150, 154 in the mounting member 142 and disk retainer 144, respectively. That portion of the fluid continues to flow through the sleeve 130 via the apertures 188b, 190b, 192b in the first and second spring seats 188, 190 and retention plate 192, respectively, to balance the control assembly 114. In the disclosed embodiment, the apertures 190b in the second spring seat 190 are substantially aligned with the apertures 192b in the retention plate 192. This ensures that pressurized fluid traveling through the regulator 100 can pass through the apertures 190b, 192b without obstruction to balance the control assembly 114. In one embodiment, one of the second spring seat 190 and the retention plate 192 may include a dimple on an axially disposed surface thereof. The other of the second spring seat 190 and retention plate 192 may include a recess for receiving the dimple. The recess would only receive the dimple when the second spring seat 190 and retention plate 192 are properly aligned to permit fluid communication between the apertures 190b, 192b, as depicted. Alternatively, in another embodiment the second spring seat 190 and retention plate 192 may comprise a single unitary member, thereby alleviating the need for specific alignment. In yet another alternative embodiment, the apertures 190b and 192b may comprise elongated apertures extending at least partially circumferentially about the spring seat 190 and the retention plate 192. So configured, the second spring seat 190 and retention plate 192 may be arranged in a plurality of relative positions and still provide the necessary fluid communication between the apertures 190b, 192b.

The portion of the fluid that flows through the valve body 102 and to the outlet 112 flows back into the fluid process control or fluid delivery system. Specifically, in one form, the pressure of the fluid at the outlet 112 is bled off into another fluid line (not shown) and directed to the second control inlet 129 in the lower actuator casing 124. Hence, the pressure at the outlet 112 of the valve body 102 equals the pressure at the second control inlet 129, which is ultimately applied to the lower diaphragm plate 136b. Additionally, in one form, the pressure at the inlet 110 is bled off into another fluid line to a pilot valve (not shown) and further directed to the first inlet control 125 in the upper actuator casing 122.

Therefore, when the pressure at the first control inlet 125 applies a force to the upper diaphragm plate 136a that is greater than a force applied by the pressure at the second control inlet 129 in combination with the positioning device assembly 138 and, more particularly, the spring 193 of the positioning device assembly 138, the diaphragm plates 136a, 136b and the control sleeve 130 displace downward against the bias of the spring 138. More specifically, the diaphragm plates 136a, 136b and the sleeve 130, as well as the retention plate 192 and the second spring seat 190 of the positioning device assembly 138 displace downward. This downward displacement compresses the spring 193 toward the first spring seat 188. Hence, it should be appreciated that as the sleeve 130 slidably displaces downward, the central rod 186 and the first spring seat 188 remain in the position depicted in FIG. 2, while the sleeve 130, retention plate 192, and second spring seat 190 displace downwardly.

Alternately, when the pressure at the second control inlet 129 in combination with the spring 193 applies a force to the control assembly 114 that is greater than the pressure at the first control inlet 125, the control assembly 114 displaces upward toward the open position depicted in FIG. 2. The sum of the upward forces acting on the diaphragm is opposed by the pressure at the first control inlet 125, which serves as a controlling pressure, to position the control assembly 114 including the sleeve 130 according to the flow required to meet a downstream demand. Additionally, if the diaphragm 134 happened to fail due to a tear in the diaphragm material, for example, the spring 193 would apply a force on the second spring seat 190, which, in turn, forces the control assembly 114 to the open position depicted in FIG. 2.

While the regulator 100 has just been described as comprising a "fail open" regulator, the positioning device assembly 138 in accordance with an alternative embodiment of the regulator 100 may be configured to define a "fail close" regulator. For example, in such an alternative embodiment, the first spring seat 188 may be fixed to the inner surface 143 of the sleeve 130 and the second spring seat 190 may be fixed to the elevator rod 186. So configured, the spring 193 disposed between the first and second spring seats 188, 190 would bias the first spring seat 188 away from the second spring seat 190, thereby biasing the sleeve 130 in a downward direction relative to the orientation of the regulator 100 depicted in FIG. 2. Furthermore, the spring 193 could be pre-loaded according to either of the above-described pre-loading operations such that in the absence of pressure in the actuator 106 or upon a failure of the diaphragm 134, the spring 193 would force the sleeve 130 to close the flow of fluid to the outlet 112.

While the control assembly 114 depicted in FIG. 2 may be pre-loaded according to either of the two pre-loading operations discussed above, an alternative embodiment of the control assembly may include shoulders, for example, disposed on opposite ends of the central rod 186 for defining a pre-loaded condition of the assembly. The particular position of the shoulders formed on the central rod 186 would be predetermined based on a predetermined amount of pre-loading required for a desired application.

Figure 3:
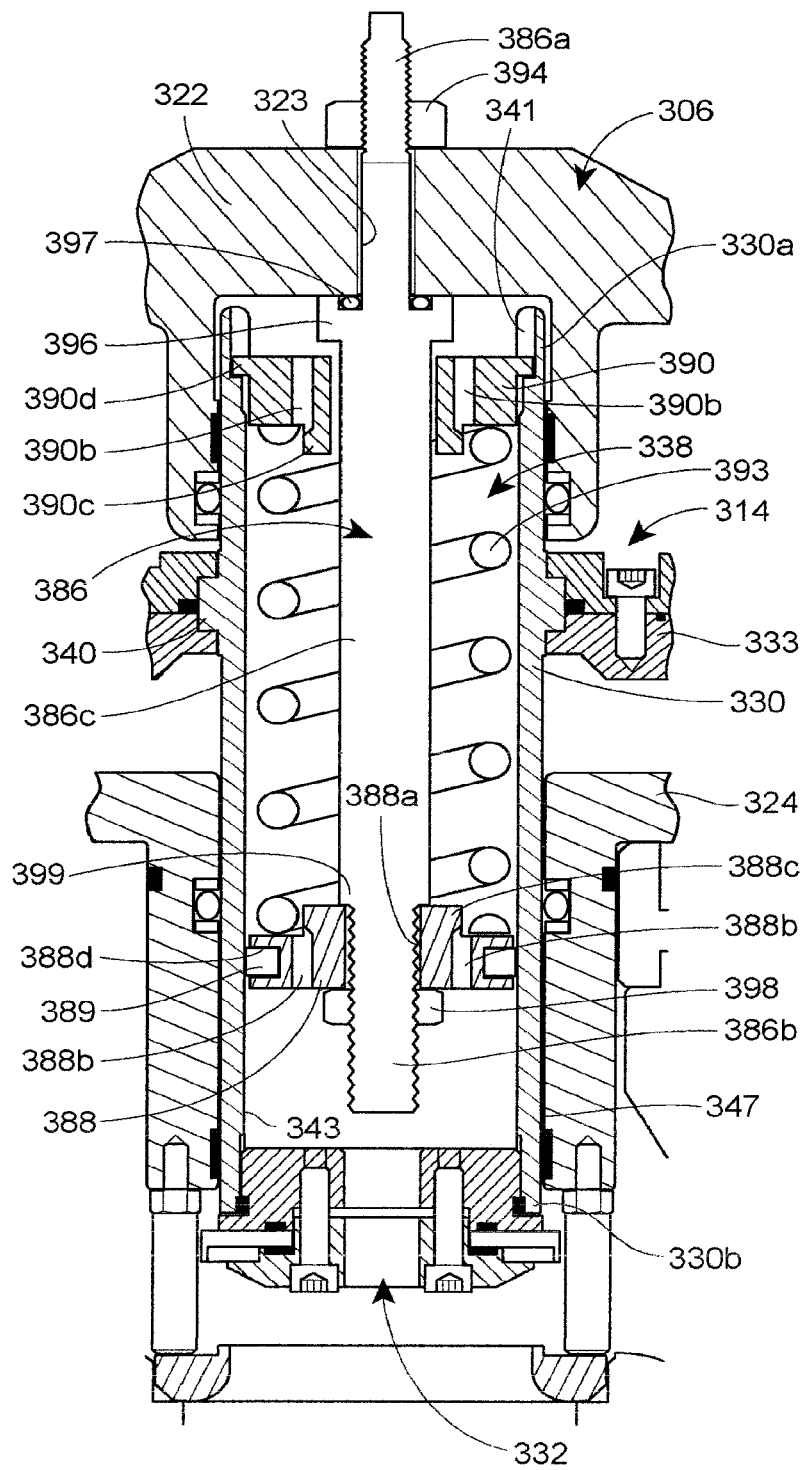
FIG. 3 is a cross-sectional side view of an alternative embodiment of a control assembly for the "fail open" regulator constructed according to FIG. 2.

FIG. 3 illustrates one such alternative control assembly 314. Similar to the control assembly 114 disclosed in FIG. 2, the control assembly 314 includes a control member such as a hollow sleeve 330, a mounting subassembly 332, a diaphragm subassembly 333, which is only partially illustrated and generally identical to the diaphragm subassembly 133 disclosed in FIG. 2, and a positioning device assembly 338. The sleeve 330 is generally tubular defining a generally cylindrical inner surface 343 and a generally cylindrical outer surface 347. The inner surface 343 defines a central bore through the sleeve 330. Additionally, the sleeve 330 includes an upper end 330a and a lower end 330b. The sleeve 330 is slidably disposed within an actuator 306, which includes upper and lower actuator casings 322, 324 (shown fragmented) and is generally identical to the actuator 106 disclosed in FIG. 2. The upper end 330a of the sleeve 330 is open and includes a circumferential flange 340 formed on the outer surface 347. Additionally, the upper portion 330a of the sleeve 330 includes a threaded portion 341 on the inner surface 343. The lower end 330b of the sleeve 330 is open and accommodates the mounting subassembly 332, the details of which are identical to the mounting subassembly 132 disclosed in FIG. 2 and, therefore, will not be repeated.

Similar to the positioning device assembly 138 described above, the positioning device assembly 338 is primarily disposed within the sleeve 330 to bias the sleeve 330 upward, relative to the actuator casings 322, 324. The positioning device assembly 338 generally comprises a central rod 386, a first spring seat 388, a second spring seat 390, and a spring 393. The central rod 386 includes a first threaded end 386a, a second threaded end 386b, and an increased diameter portion 386c disposed between the first and second threaded ends 386a, 386b. The increased diameter portion 386c defines an upper shoulder 396 adjacent the first threaded end 386a and a lower shoulder 399 adjacent the second threaded end 386b. The first threaded end 386a extends through a central opening 323 in the upper actuator casing 322. An external nut 394 is threaded onto the first threaded end 386a and engages the upper actuator casing 322 to limit axial displacement of the central rod 386 in the downward direction relative to the orientation of the actuator 306 depicted in FIG. 3. The upper shoulder 396 of the central rod 386 engages the upper actuator casing 322 opposite the external nut 394 and limits axial displacement of the central rod 386 in the upward direction relative to the orientation of the actuator 306 depicted in FIG. 3. In the disclosed embodiment, the upper shoulder 396 accommodates an o-ring 397 to provide a fluid-tight seal with the upper actuator casing 322 to prevent fluid from leaking out of the central opening 323. Accordingly, the first threaded end 386a of the central rod 386 is effectively fixed to the upper actuator casing 322 and the second threaded end 386b extends into the actuator 306.

As depicted, the second threaded end 386b of the central rod 386 extends into the sleeve 330 and is disposed adjacent the second end 330b of the sleeve 330. A retention nut 398 is threaded onto the second threaded end 386b of the central rod 386. The first spring seat 388 is slidably disposed within the sleeve 330. More specifically, the first spring seat 388 comprises a generally cylindrical plate defining a central opening 388a, a plurality of apertures 388b, a stepped portion 388c, and an annular recess 388d that receives a guide ring 389. The central opening 388a receives the second threaded end 386b of the central rod 386, and the retention nut 398 fixes the first spring seat 388 against the lower shoulder 399 of the central rod 386. The plurality of apertures 188b are in fluid communication with a flow path through the regulator, as described above with reference to the first spring seat 188 disclosed in FIG. 2.

The second spring seat 390 comprises a generally cylindrical plate defining a central opening 390a, a plurality of apertures 390b, a stepped portion 388c, and a threaded portion 388d. The central opening 390a in the second spring seat 390 receives the increased diameter portion 286c of the central rod 386 near the first threaded end 386a. The threaded portion 388d is in threaded engagement with the threaded portion 341 of the sleeve 330, thereby fixing the second spring seat 390 to the sleeve 300. The plurality of apertures 390b are in fluid communication with the plurality of apertures 388b in the first spring seat 388, and therefore the flow-path through the regulator.

Accordingly, as depicted, the spring 393 is disposed axially between and in engagement with the first spring seat 388 and the second spring seat 390. More specifically, in the disclosed embodiment, the spring 393 is supported between the stepped portions 388c, 390c of the first and second spring seats 388, 390, which help maintain the alignment of the spring 393 relative to the other components.

During assembly, with the upper actuator casing 322 removed from the lower actuator casing 324 and the sleeve 330 removed from the actuator 306, a technician threads the second spring seat 390 into engagement with the threaded portion 341 on the upper end 330a of the sleeve 330. In one embodiment, an adhesive such as Loctite 242 may be applied to the threaded portion 341 of the sleeve and/or the threaded portion 388d of the second spring seat 390 prior to threading the two components together. Next, the o-ring 397 is lubricated and positioned within the shoulder 396 of the central rod 386, as depicted in FIG. 3. The central rod 386 is then disposed through the central opening 390a in the upper spring seat 390 such that the increased diameter portion 386c is disposed within the sleeve 300, as depicted. The spring 393 is then inserted through the lower end 330b of the sleeve 330 and positioned around the stepped portion 390c of the second spring seat 390. With the spring 393 in position, the first spring seat 388 is inserted onto the second threaded end 386b of the central rod 386. Prior to positioning the first spring seat 388, however, the technician may be required to position the guide ring 389 within the annular recess 388d in the first spring seat 388. Nevertheless, with the first spring seat 388 in position on the second threaded end 386b of the central rod 386, the retention nut 398 is threaded onto the second threaded end 386a and tightened against the first spring seat 388 such that the stepped portion 388c of the first spring seat 388 engages the lower shoulder 399 of the central rod 386 and receives the spring 393, as depicted. In one embodiment, the spring 393 compress, and is therefore pre-loaded, approximately one inch (1") before the spring seat 388 engages the shoulder 399. With the positioning device assembly 338 assembled, it is inserted into the removed upper actuator casing 322 such that the first threaded end 386a of the central rod 386 is disposed through the central opening 323. So configured, the external nut 394 is threaded onto the first threaded end 386a and the central rod 386 is thereby fixed to the upper actuator casing 322. Finally, the control assembly 314 is inserted into the lower actuator casing 324 and the upper actuator casing 322 is affixed thereto with bolts, or some other conventional means.

It should be appreciated that the control assembly 314 disclosed in FIG. 3 operates substantially similarly to the control assembly 114 disclosed with reference to FIG. 2, and therefore, the details of such operation will not be repeated.

While the control assembly 314 disclosed in FIG. 3 includes a single central rod 386, one alternative embodiment of a control assembly 314 constructed in accordance with the present invention may comprise multiple central rods 386, each having shoulders 396, 399 positioned at different locations such that a technician or engineer may pre-select the appropriate central rod 386 to pre-load the spring 393 a particular amount for a particular application.

Figure 4:
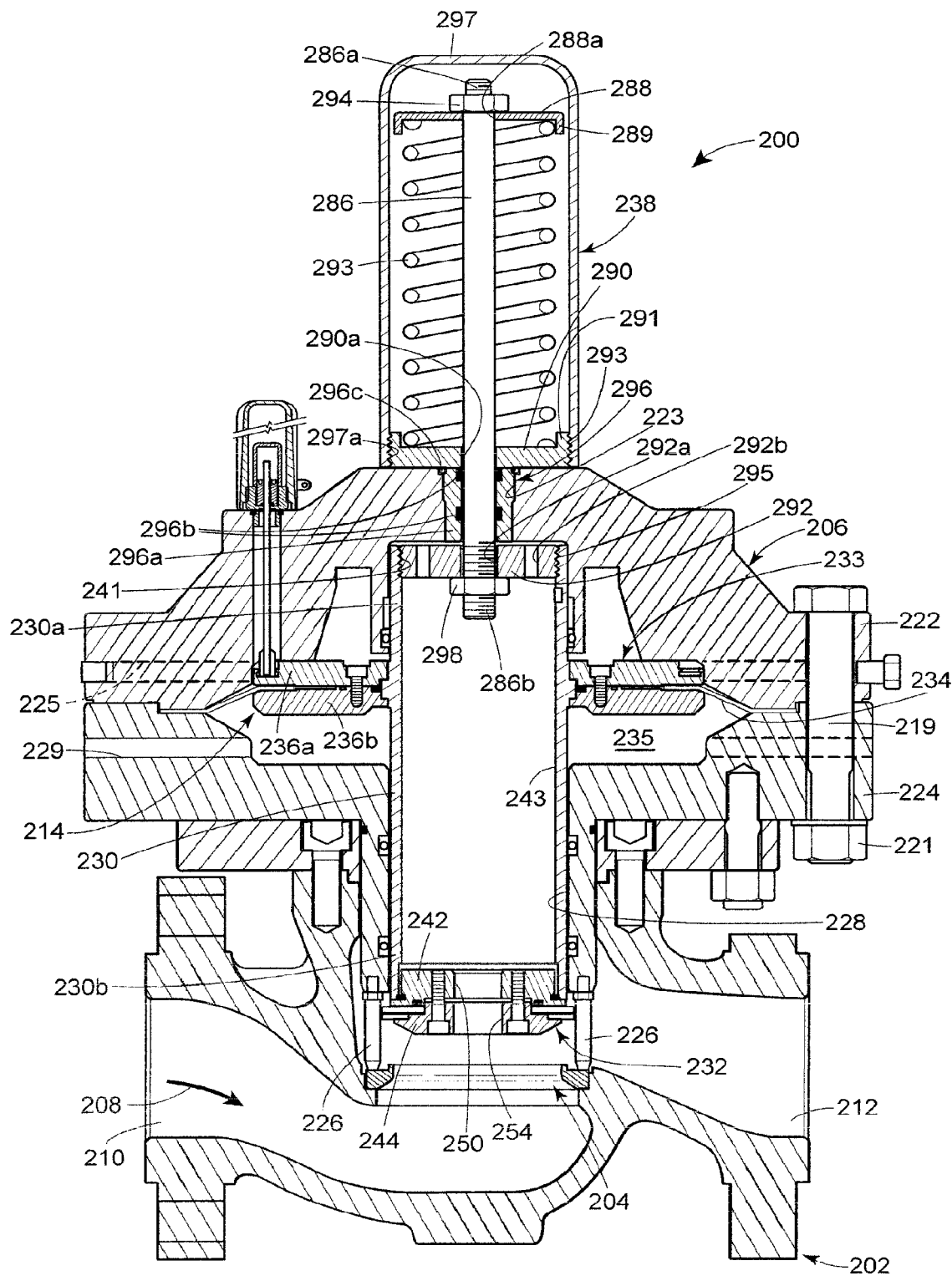
FIG. 4 is a cross-sectional side view of a second embodiment of a "fail open" regulator constructed in accordance with the principles of the present disclosure.

FIG. 4 depicts an alternative embodiment of a regulator 200 constructed according to the principles of the present disclosure. The regulator 200 depicted in FIG. 4 is substantially similar to the regulator 100 described above with reference to FIG. 2 in that the regulator 200 generally comprises a valve body 202 and an actuator 206. The valve body 202 defines a flow-path 208 extending between an inlet 210 and an outlet 212, as well as into the actuator 206. The actuator 206 includes a control assembly 214 that is moveable between an open position, as is shown in FIG. 4, and a closed position (not shown). Movement of the control assembly 214 occurs in response to fluctuations in the pressure of the fluid at the inlet 210 and outlet 212 of the valve body 202. Accordingly, the position of the control assembly 214 relative to the seat ring 204 effects a flow capacity of the pressure regulator 200. In general, the valve body 202 and actuator 206 are identical to the valve body 102 and the actuator 106 described above with reference to FIG. 2, and therefore only the distinctions will be described in detail.

For example, the control assembly 214 comprises a sleeve 230, a mounting subassembly 232, a diaphragm subassembly 233, and a positioning device assembly 238. The sleeve 230, mounting subassembly 232, and diaphragm subassembly 233 are identical to those described above. The positioning device assembly 238, however, is distinct from the positioning device assembly 138 described above.

The positioning device assembly 238 depicted in FIG. 4 is primarily disposed outside of the sleeve 230, as well as the actuator 206, and adjacent the upper actuator casing 222. The positioning device assembly 238 generally comprises a central rod 286, a first spring seat 288, a second spring seat 290, a spring 293, a retention plate 292, a seal assembly 296, and an enclosure 297.

The second spring seat 290 comprises a generally cylindrical plate including a central opening 290a, a cylindrical flange portion 291, and an external threaded portion 293. The first spring seat 288 comprises a generally cylindrical plate including a central opening 288a and a cylindrical flange portion 289. The spring 293 of the depicted form comprises a coil spring disposed concentrically around the central rod 286 and axially between the first and second spring seats 288, 290. The cylindrical flange portions 289, 291 of the first and second spring seats 288, 290, respectively, retain the spring 293 between the spring seats 288, 290.

The second spring seat 290 is fixed relative to and disposed in engagement with an external surface of the upper actuator casing 222 such that the central opening 290a is generally axially aligned with the opening 223 in the upper actuator casing 222. The spring 293 is axially disposed upon the second spring seat 290. The first spring seat 288 is axially disposed upon the spring 293 opposite the second spring seat 290. A first retention nut 294 is threaded onto a first threaded end 286a of the central rod 286 adjacent the first spring seat 288. The first retention nut 294 retains the relative axial disposition of the spring 293, the first spring seat 288, and the second spring seat 290. So configured, the first spring seat 288 is fixed relative to the central rod 286. The enclosure 297 comprises a generally elongated tubular structure having an internal threaded portion 297a. The threaded portion 297a of the enclosure 297 is in threaded engagement with the threaded portion 293 of the second spring seat 290.

Similar to that described above with reference to the regulator 100 depicted in FIG. 2, the retention plate 292 comprises a generally cylindrical plate defining a central opening 292a, a plurality of apertures 292b, and an external threaded portion 295. The threaded portion 295 is in threaded engagement with a threaded portion 241 on an inner surface 243 of the sleeve 230, thereby fixing the retention plate 292 to the sleeve 230. The apertures 292b are in fluid communication with throughbores 250, 254 in the mounting subassembly 232, and therefore the flow-path 208. The central opening 292a receives a second threaded end 286b of the central rod 286. A second retention nut 298 is in threaded engagement with the second threaded end 286b of the central rod 286 adjacent the retention plate 292. Accordingly, the second retention nut 298 fixes the retention plate 292 against displacement relative to the central rod 286 in the downward direction relative to the orientation of the regulator 200 depicted in FIG. 4.

The seal assembly 296 is disposed within a central opening 223 of the upper actuator casing 222. The seal assembly 296 provides a fluid tight seal between the central rod 286 and the upper actuator casing 222. In the embodiment depicted in FIG. 4, the seal assembly comprises a bushing 296a, a pair of grommets 296b, and an o-ring 296c. The bushing 296a is fixed within the central opening 223 and locates the grommets 296b and the o-ring 296c. The grommets 296b provide a sliding seal such that bi-directional displacement of the central rod 286 relative to the upper actuator casing 222 does not leak the pressure in the sleeve 230. The o-ring 296c is disposed between the bushing 296a, the upper actuator casing 222, and the second spring seat 290. The o-ring 296c forms a fluid tight seal between the bushing 296a and the upper actuator casing 222. In one embodiment, the bushing 296a is constructed of a semi-rigid or rigid polymer, while the grommets 296b and the o-ring 296c are constructed of a resilient material such as an elastomer or a rubber. It should be appreciated that while the central opening 223 in the upper actuator casing 222 depicted in FIG. 4 is slightly larger than a diameter of the central opening 123 in the upper actuator casing 122 of the regulator 100 depicted in FIG. 2, such depiction is merely schematic and alternative embodiments may include the same diameter central openings. For example, in one embodiment, a diameter of the central rod 286 of FIG. 4 may be reduced, thereby allowing for a smaller central opening 223 capable of accommodating both the central rod 286 and the seal assembly 296.

During assembly, with the upper actuator casing 222 removed from the lower actuator casing 224 and the sleeve 230 removed from between diaphragm plates 236a, 236b, the retention plate 292 is threaded into the threaded portion 241 of the sleeve 230. Subsequently, the second retention nut 298 is threaded onto the second threaded end 286b of the central rod 286. The first threaded end 286a of the central rod 286 is then disposed through the central opening 292a of the retention plate 292 via the lower end 230b of the sleeve 230. Next, the seal assembly 296 is secured within the central opening 223 of the upper actuator casing 222. Then, the first threaded end 286a of the central rod 286 is disposed through the seal assembly 296 such that the retention plate 292 engages the upper actuator casing 222, as depicted in FIG. 4. With the central rod 286 positioned relative to the upper actuator casing 222, the second spring seat 290, the spring 293, and the first spring seat 288 are slid onto the first threaded end 286a of the central rod 286, in that order. The first retention nut 294 is then threaded onto the first threaded end 286a of the central rod 286 to secure the spring seats 288, 290 and spring 293 onto the central rod 286. The sleeve 230 may then be secured between the diaphragm plates 236a, 236b and the upper actuator casing 222 secured to the lower actuator casing 224.

At this point, a technician or engineer may preload the positioning device assembly 238 by tightening the retention nut 294 disposed adjacent the first spring seat 288 on the first threaded end 286a of the central rod 286. For example, tightening the retention nut 294 forces the first spring seat 288 downward relative to the orientation of the regulator 200 depicted in FIG. 4. This causes the first spring seat 288 to compress the spring 293 against the second spring seat 290, thereby pre-loading the control assembly 214.

Alternatively, prior to securing the sleeve 230 between the diaphragm plates 236a, 236b, a technician or engineer may tighten the second retention nut 298 disposed adjacent the retention plate 292 within the sleeve 230 to pre-load the spring 293. Doing so, however, would require a tool such as an elongated socket capable of reaching and/or extending from the lower end 230b of the sleeve 230 to the upper end 230a of the sleeve 230. Nevertheless, in either of the above-described pre-loading operations for the positioning device assembly 238, compressing the spring 293 a predetermined amount provides a predetermined amount of pre-load for acting on the retention plate 292 to bias the sleeve 230 into the open position depicted in FIG. 4.

Additionally, it should be appreciated that in one embodiment of the positioning device assembly 238, the central rod 286 may comprise markings along the lengths of one or both of the first and second threaded ends 286a, 286b such that the technician or engineer performing the pre-loading operation may tighten the appropriate retention nut 294, 298 to a predetermined position on the central rod 286. In another embodiment, the first and/or second threaded ends 286a, 286b of the central rod 286 may include shoulders, at which the threads on the threaded ends 286a, 286b terminate. The particular position of the shoulders formed on the central rod 286 would be predetermined based on a predetermined amount of preloading required for a desired application of the regulator 200. Accordingly, during the pre-loading operation, the technician or engineer may tighten either or both of the retention nuts 294, 298 into engagement with the respective shoulder. One embodiment of the regulator 200 and/or the positioning device assembly 238 may comprise multiple central rods 286 such that the technician or engineer may pre-select the appropriate central rod 286 having shoulders specifically positioned to pre-load the spring 293 a particular amount for a particular application.

With the positioning device assembly 238 of the embodiment depicted in FIG. 4 appropriately preloaded, the threaded portion 297a of the enclosure 297 is threaded into engagement with the threaded portion 293 of the second spring seat 290. The enclosure 297 therefore protects the spring seats 288, 290, the central rod 286, the spring 293, and the seal assembly 296 from collecting dirt, dust, debris, moisture, or any other material, as well as from damage caused by potential impact.

In general, when the regulator assembly 200 is installed within a fluid process control or fluid delivery system, the control assembly 214 is able to reciprocally displace within a cavity 235 and a hollow neck 228 of the actuator 206 according to the pressures at the inlet 210 and outlet 212 of the valve body 202. Specifically, fluid flows from the inlet 210 of the valve body 202 and through the throat 216. Once the fluid passes through the throat 216, a substantial portion of the fluid flows to the outlet 212 while the remainder flows into the sleeve 230 in a manner similar to that described above with respect to the regulator 100 depicted in FIG. 2. That portion of the fluid flows through the sleeve 230 including through the apertures 292b in the retention plate 292, thereby balancing the control assembly 214. Therefore, it should be appreciated that the pressure engages the portion of the seal assembly 296 exposed to the cavity 235 of the actuator 206. As mentioned above, however, the bushing 296a in combination with the grommets 296b and the o-ring 296c prevent any pressure loss to occur between the central opening 223 and the central rod 286.

The portion of the fluid that flows through the valve body 202 and to the outlet 212 flows back into the fluid process control system. Specifically, in one form, the pressure of the fluid at the outlet 212 is bled off into another fluid line (not shown) and directed to a second control inlet 229 in the lower actuator casing 224. Hence, the pressure at the outlet 212 of the valve body 202 equals the pressure at the second control inlet 229, which is ultimately applied to the lower diaphragm plate 236b. Additionally, in one form, the pressure at the inlet 210 is bled off into another fluid line to a pilot valve (not shown) and further directed to a first control inlet 225 in the upper actuator casing 222.

Therefore, when the pressure at the first control inlet 225 applies a force to the upper diaphragm plate 236a that is greater than a force applied by the pressure at the second control inlet 229 in combination with the positioning device assembly 238 and, more particularly, the spring 293 of the positioning device assembly 238, the diaphragm plates 236a, 236b and the sleeve 230 displace downward against the bias of the spring 238. More specifically, the diaphragm plates 236a, 236b and the sleeve 230, as well as the retention plate 292, the central rod 286, and the first spring seat 288 of the positioning device assembly 238 displace downward. This downward displacement compresses the spring 293 toward the second spring seat 290 beyond its pre-loaded amount. Hence, it should be appreciated that as the sleeve 230 slidably displaces downward in the cavity 235, the central rod 286 slidably and sealingly displaces through the seal assembly 296 disposed in the central opening 223 of the upper actuator casing 222 and the second spring seat 290 remains fixed in the position depicted in FIG. 4.

Alternately, when the pressure at the second control inlet 229 in combination with the spring 293 applies a force to the control assembly 214 that is greater than the pressure at the first control inlet 225, the control assembly 214 displaces upward toward the open position depicted in FIG. 4. More specifically, the sleeve 230, the diaphragm plates 236a, 236b, and the retention plate 292 of the control assembly 214, as well as the central rod 286 and the first spring seat 288 of the positioning device assembly 238, displace to the position illustrated in FIG. 4. The sum of the upward forces acting on the diaphragm subassembly 233 is opposed by the pressure at the first control inlet 225, which serves as a controlling pressure, to position the control assembly 214 including the sleeve 230 according to the flow required to meet the downstream demand. Additionally, if the diaphragm 234 happened to fail due to a tear in the diaphragm material, for example, the spring 293 of the positioning device assembly 238 would apply a force to the first spring seat 288, which, in turn, applies a force to the central rod 286 and the retention plate 292, to force the sleeve 130 of the control assembly 214 to the open position depicted in FIG. 4.

While the regulator 200 has just been described as comprising a "fail open" regulator, the positioning device assembly 238 in accordance with an alternative embodiment of the regulator 200 may be configured to define a "fail close" regulator. For example, in such an alternative embodiment, the first spring seat 288 would be fixed to the enclosure 297. Additionally, the central rod 286, the second spring seat 290, the retention plate 292, and the sleeve 230 would all be rigidly fixed together. The second spring seat 290 would also be freely axially displaceable within the enclosure 297, as opposed to being in threaded engagement with the enclosure 297.

So configured, the spring 293 disposed between the first and second spring seats 288, 290 would bias the second spring seat 290 away from the first spring seat 288, thereby biasing the central rod 286, the retention plate 292, and the sleeve 230 in a downward direction relative to the orientation of the regulator 200 depicted in FIG. 4. Furthermore, the spring 293 could be pre-loaded according to either of the above-described pre-loading operations such that in the absence of pressure in the actuator 206 or upon failure of the diaphragm 234, the spring 293 would force the sleeve 230 to close the flow of fluid to the outlet 212. In one embodiment of this "fail close" configuration, the retention plate 292 would be secured adjacent the lower end 230b of the sleeve 230. Accordingly, the central rod 286 would be linearly displaced relative to that depicted in FIG. 4 such that a majority thereof would be disposed in the sleeve 230. More specifically, in one embodiment, the first threaded end 286a of the threaded rod 286 could be in threaded engagement with the central opening 290a of the second spring seat 290. Similarly, the first threaded end 286a of the central rod 286 could be in threaded engagement with the central opening 292a in the retention plate 292.

Figure 1:
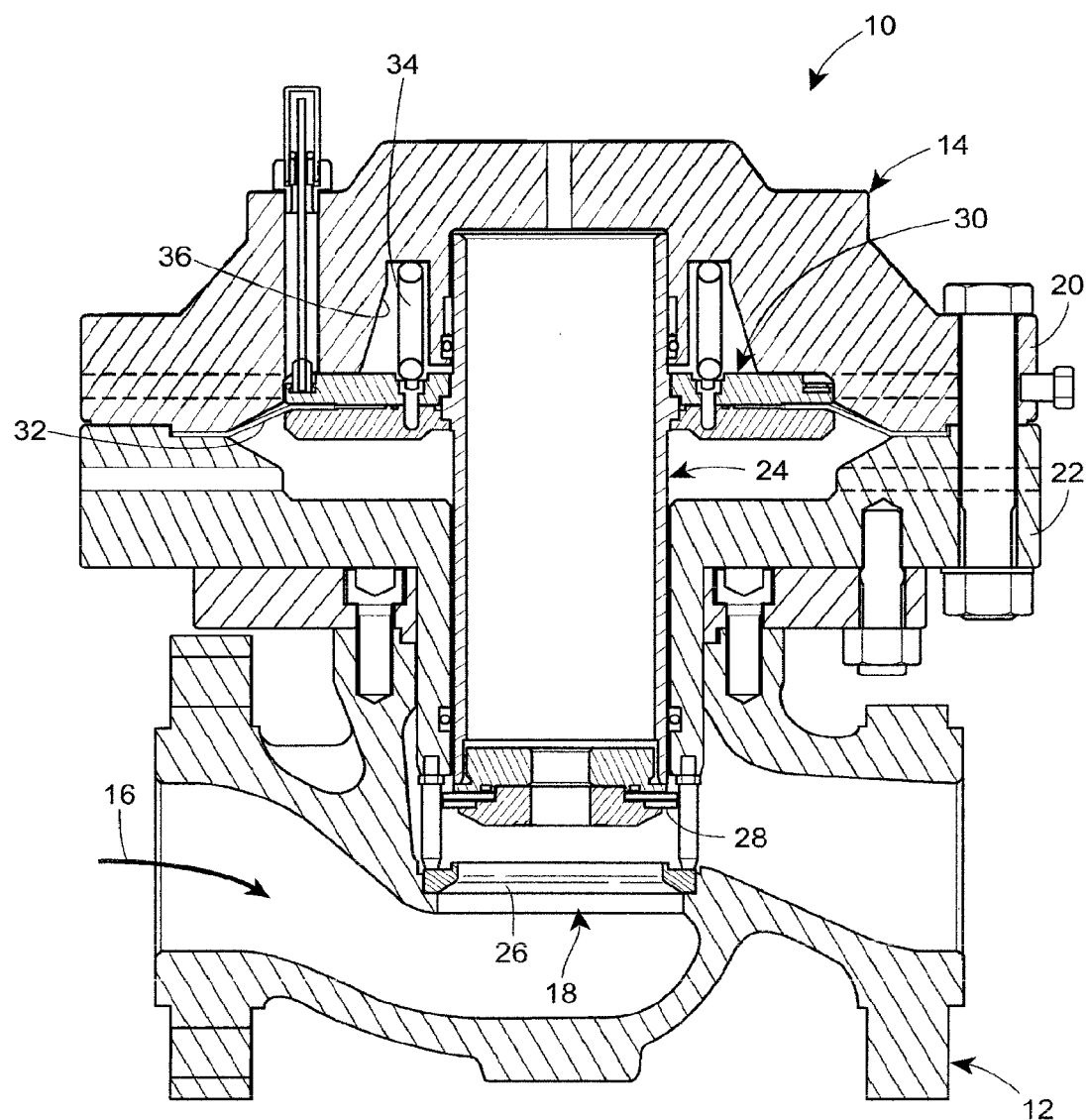
FIG. 1 is a cross-sectional side view of one conventional "fail close" regulator.

Accordingly, in light of the foregoing, it should be appreciated that the present disclosure provides for a fluid regulator that is operable in a "fail open" or "fail close" configuration. More specifically, the present disclosure provides a control assembly 114, 214, 314 that is adaptable to a conventional "fail close" regulator, such as that depicted and described with reference to FIG. 1, without requiring any structural modification or redesigning of the existing component of the conventional regulator 10. Furthermore, the present disclosure provides for a positioning device assembly 138, 238, 338 operable to bias a control member such as a sleeve 130, 230, 330 of a regulator 10, 100, 200 into a predetermined position within the actuator 106, 206, 306 and/or valve body 102, 202, 302 with which the control assembly 114, 214, 314 is associated. The predetermined position may include the "fail open" or the "fail close" positions described herein or may include any other position that may be desired for a particular application and which is located between the "fail open" and "fail close" positions.

Finally, it should be appreciated that while the present disclosure has been provided in the context of a pressure regulator, it may be successfully incorporated into other fluid process control devices including control valves, actuators, and any other foreseeable device.

In light of the foregoing, the description of the present disclosure should be understood as merely providing examples of the present invention and, thus, variations that do not depart from the gist of the invention are intended to be within the scope of the invention.

What is claimed:

1. A control assembly for regulating the flow of a fluid through a fluid flow-path of a regulator, the control assembly comprising:

a control member;

a diaphragm subassembly connected to the control member and including a diaphragm, the diaphragm extending radially outward from the control member and adapted to respond to pressure changes on opposing sides thereof for moving the control member when installed within a regulator;

a central rod adapted to be disposed through a casing of the regulator;

a first spring seat defining an opening receiving the central rod, the first spring seat fixed relative to the central rod;

a second spring seat defining an opening receiving the central rod, the second spring seat fixed relative to the regulator casing;

a spring disposed between the first and second spring seats, the spring biasing the control member into a predetermined position relative to the regulator casing;

a retention plate fixed relative to the control member and the central rod, wherein the retention plate is adapted to be disposed in the fluid flow-path of the regulator and defines an aperture in fluid communication with the fluid flow path.

2. The control assembly of claim 1, wherein the first spring seat, the second spring seat, and the spring are disposed outside of the control member.

3. The control assembly of claim 1, wherein the control member comprises a hollow tubular sleeve.

4. The control assembly of claim 1, wherein the retention plate is disposed inside of the control member.

5. The control assembly of claim 1, wherein the diaphragm subassembly comprises upper and lower diaphragm plates sandwiching at least a portion of the diaphragm.

6. A regulator, comprising:
a valve body defining a flow-path for a fluid;
an actuator casing coupled to the valve body;
a control member disposed within the actuator casing and adapted for displacement relative to the valve body for regulating a flow of the fluid through the flow-path;
a diaphragm subassembly connected to the control member and including a diaphragm, the diaphragm extending radially outward from the control member and adapted to respond to pressure changes on opposing sides thereof for moving the control member in the actuator casing;
a central rod disposed through the actuator casing;
a first spring seat fixed relative to the central rod;
a second spring seat fixed relative to the actuator casing;
a spring disposed between the first spring seat and the second spring seat, the spring biasing the control member into a predetermined position within the casing of the regulator; and
a retention plate fixed relative to the control member and the central rod, wherein the retention plate is disposed in the fluid flow-path of the regulator and defines an aperture in fluid communication with the fluid flow-path.

7. The regulator of claim 6, wherein the first spring seat, the second spring seat, and the spring are disposed outside of the control member, and the second spring seat is fixed relative to the regulator casing.

8. The regulator of claim 6, further comprising a valve seat carried by the valve body, wherein the spring biases the control member away from the valve seat.

9. The regulator of claim 6, wherein the control member comprises a hollow tubular sleeve.

10. The regulator of claim 6, wherein the retention plate is disposed inside of the control member.

11. The regulator of claim 6, wherein the diaphragm subassembly comprises upper and lower diaphragm plates sandwiching at least a portion of the diaphragm.

12. A regulator, comprising:
a valve body defining a flow-path for a fluid;
an actuator casing coupled to the valve body;
a control member disposed within the actuator casing and adapted for displacement relative to the valve body for regulating a flow of the fluid through the flow-path;
a diaphragm subassembly connected to the control member and including a diaphragm, the diaphragm extending radially outward from the control member and adapted to respond to pressure changes on opposing sides thereof for moving the control member in the actuator casing;
a positioning device assembly comprising a central rod and a spring disposed about the central rod, at least a portion of the central rod disposed within the control member, the spring disposed outside of the control member and biasing the control member into a predetermined position relative to the valve body,
wherein the positioning device assembly further comprises:
a first spring seat fixed relative to the central rod; and
a second spring seat fixed relative to the actuator casing, wherein the spring is disposed between the first and second spring seats,
wherein the first spring seat, the second spring seat, and the spring are disposed outside of the control member; and
a retention plate fixed relative to the control member and the central rod, the retention plate disposed in the fluid flow-path of the regulator and defining an aperture in fluid communication with the fluid flow-path.

13. The regulator of claim 12, further comprising a valve seat carried by the valve body, wherein the spring biases the control member away from the valve seat.

14. The regulator of claim 12, wherein the control member comprises a hollow tubular sleeve.

15. The regulator of claim 12, wherein the retention plate is disposed inside of the control member.

16. The regulator of claim 12, wherein the diaphragm subassembly comprises upper and lower diaphragm plates sandwiching at least a portion of the diaphragm.

* * * * *